United States Patent
Otwani et al.

(10) Patent No.: US 10,912,066 B2
(45) Date of Patent: *Feb. 2, 2021

(54) METHOD AND USER EQUIPMENT (UE) FOR MANAGING HARQ FEEDBACK TRANSMISSION IN WIRELESS COMMUNICATION NETWORK

(71) Applicant: SAMSUNG ELECTRONICS CO., LTD., Suwon-si (KR)

(72) Inventors: Jitendra Otwani, Indore (IN); Pradeep Dwarakanath, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,256

(22) Filed: Nov. 18, 2019

(65) Prior Publication Data

US 2020/0187184 A1 Jun. 11, 2020

Related U.S. Application Data

(63) Continuation of application No. 15/912,936, filed on Mar. 6, 2018, now Pat. No. 10,517,076.

(30) Foreign Application Priority Data

Jul. 14, 2017 (IN) .............................. 201741025108

(51) Int. Cl.
*H04W 72/04* (2009.01)
*H04L 1/18* (2006.01)
(Continued)

(52) U.S. Cl.
CPC ...... *H04W 72/0406* (2013.01); *H04B 1/3816* (2013.01); *H04L 1/1812* (2013.01);
(Continued)

(58) Field of Classification Search
None
See application file for complete search history.

(56) References Cited

U.S. PATENT DOCUMENTS 9,295,080 B2 3/2016 Yang et al.
2008/0107053 A1 5/2008 Kim et al.
(Continued)

*Primary Examiner* — Jay L Vogel
(74) *Attorney, Agent, or Firm* — Sughrue Mion, PLLC

(57) ABSTRACT

A method for managing Hybrid Automatic Repeat Request (HARQ) feedback transmission by a Dual Sim Dual Standby (DSDS) User Equipment (UE) in a wireless communication network, is provided. The method includes determining, by the DSDS UE, whether a first parameter associated with a primary packet data is identical to a second parameter associated with a secondary packet data. Each of the first parameter and the second parameter comprises a reordering timer value, a New Data Indicator (NDI), a HARQ process number, and a DSDS Radio Frequency (RF) gap duration. The method further includes, in response to the first parameter associated with the primary packet data being determined to be identical to the second parameter associated with the secondary packet data and the primary packet data being successfully decoded at the DSDS UE, performing, by the DSDS UE, the HARQ feedback transmission with the wireless communication network.

20 Claims, 8 Drawing Sheets

(51) Int. Cl.
*H04B 1/3816* (2015.01)
*H04W 8/18* (2009.01)
*H04W 88/02* (2009.01)

(52) U.S. Cl.
CPC .......... *H04L 1/1822* (2013.01); *H04L 1/1848* (2013.01); *H04L 1/1854* (2013.01); *H04W 72/044* (2013.01); *H04W 8/183* (2013.01); *H04W 88/02* (2013.01)

(56) References Cited

U.S. PATENT DOCUMENTS

| | | |
|---|---|---|
| 2011/0080972 A1 | 4/2011 | Xi et al. |
| 2011/0134813 A1 | 6/2011 | Park et al. |
| 2015/0280880 A1* | 10/2015 | Yang .................... H04L 1/1812 370/329 |
| 2015/0334740 A1* | 11/2015 | Yang .................... H04L 1/1812 370/329 |
| 2015/0382328 A1 | 12/2015 | Jiang et al. |
| 2016/0315736 A1* | 10/2016 | Dwarakanath ........ H04W 24/02 |

* cited by examiner

METHOD AND USER EQUIPMENT (UE) FOR MANAGING HARQ FEEDBACK TRANSMISSION IN WIRELESS COMMUNICATION NETWORK

CROSS-REFERENCE TO THE RELATED APPLICATION

This is a continuation application of U.S. patent application Ser. No. 15/912,936, filed Mar. 6, 2018, in the U.S. Patent and Trademark Office, which claims priority from Indian Patent Application No. 201741025108 filed on Jul. 14, 2017, in the Indian Patent Office, the disclosures of which are incorporated by reference herein in their entireties.

BACKGROUND

1. Field

Methods and apparatuses consistent with example embodiments relate to a wireless communication network, and more particularly to a method and User Equipment (UE) for managing hybrid automatic repeat request (HARQ) feedback transmission in the wireless communication network.

2. Description of Related Art

In general, Dual Sim Dual Standby (DSDS) phones (i.e., DSDS User Equipment (UE)) are designed to share a single radio frequency (RF) between two stacks (i.e., stack-1 and stack-2). When the stack-1 of the DSDS UE is performing a high-speed downlink packet access/Long Term Evolution (HSDPA/LTE) data transfer, it may use the RF continuously. However, to maintain paging reception, measurements and signaling on the stack-2 of the DSDS UE, RF usage gaps (i.e., DSDS gaps) are created temporarily for the stack-1 either in a scheduled or unscheduled fashion.

A base station (i.e., network (NW)) on each hybrid automatic repeat request (HARQ) process after a first new transmission does multiple retransmissions in case if a HARQ acknowledgement (ACK) is not received on a high speed dedicated physical control channel (HS-DPCCH) in HSDPA and on a Physical Uplink Control Channel (PUCCH) or Physical Uplink Shared Channel (PUSCH) in an LTE uplink channel. In the DSDS UE, interruptions on the HS-DPCCH transmission can occur due to activities (e.g., to maintain paging reception, measurements and signaling on the stack-2 of the DSDS UE) on another subscriber identity module (SIM).

During the RF usage gaps, the HS-DPCCH transmission is halted, which means the ACKs last successfully received on a high-speed physical downlink shared channel (HS-PDSCH) in HSDPA and on a PDSCH in LTE downlink packets are not transmitted to the base station. In such a case, the base station (unaware of the DSDS Pause) continues to decode the HS-DPCCH channel (contains noise as no transmission from the DSDS UE) and assumes that the DSDS UE is not able to receive the downlink packet. As a result of this, the base station retransmits the downlink packet to the DSDS UE in subsequent HARQ processes. As the DSDS UE continues to be in the DSDS gap, this network retransmission repeats for a NW decided value. This value, a number of HARQ retransmissions on each HARQ process, is not known to the DSDS UE. Thus, when the DSDS UE resumes from the DSDS gap, it conventionally starts fresh reception and transmits all HARQ information.

Thus, the aforementioned disruptions can cause loss in throughput, can increase latency due to packet recovery delay, and can waste further wireless resources as the NW is unaware of these disruptions at the DSDS UE.

SUMMARY

According to example embodiments, there is provided a method for managing Hybrid Automatic Repeat Request (HARQ) feedback transmission by a Dual Sim Dual Standby (DSDS) User Equipment (UE) in a wireless communication network. The method includes determining, by the DSDS UE, whether a first parameter associated with a primary packet data is identical to a second parameter associated with a secondary packet data. Each of the first parameter and the second parameter comprises a reordering timer value, a New Data Indicator (NDI), a HARQ process number, and a DSDS Radio Frequency (RF) gap duration. The method further includes, in response to the first parameter associated with the primary packet data being determined to be identical to the second parameter associated with the secondary packet data and the primary packet data being successfully decoded at the DSDS UE, performing, by the DSDS UE, the HARQ feedback transmission with the wireless communication network.

According to example embodiments, there is provided a Dual Sim Dual Standby (DSDS) User Equipment (UE) for managing Hybrid Automatic Repeat Request (HARQ) feedback transmission in a wireless communication network, the DSDS UE including a memory, and a processor coupled to the memory. The DSDS UE further includes a HARQ feedback manager coupled to the processor and configured to determine whether a first parameter associated with a primary packet data is identical to a second parameter associated with a secondary packet data. Each of the first parameter and the second parameter comprises a reordering timer value, a New Data Indicator (NDI), a HARQ process number, and a DSDS Radio Frequency (RF) gap duration. The HARQ feedback manager is further configured to, in response to the first parameter associated with the primary packet data being determined to be identical to the second parameter associated with the secondary packet data and the primary packet data being successfully decoded at the DSDS UE, perform the HARQ feedback transmission with the wireless communication network.

According to example embodiments, there is provided a method for managing Hybrid Automatic Repeat Request (HARQ) feedback transmission by a Dual Sim Dual Standby (DSDS) User Equipment (UE) in a wireless communication network, the method including receiving, by the DSDS UE, a primary packet data and receiving a secondary packet data after a DSDS RF gap duration from the time of receiving the primary packet data, comparing, by the DSDS UE, a HARQ related first parameter associated with the primary packet data and a HARQ related second parameter associated the secondary packet data, selecting, by the DSDS UE, either a first decoding result of the first data packet or a second decoding result for the second data packet based on the comparison result, and performing, by the DSDS UE, the HARQ feed back transmission using the selected decoding result.

DETAILED DESCRIPTION OF THE EXAMPLE EMBODIMENTS

All the figures illustrated herein disclose a method for performing HSDPA HARQ decoding but is not limited thereto. The proposed method can also be applicable for corresponding LTE PDSCH HARQ decoding, without limiting the scope of the example embodiments as disclosed herein.

Accordingly, the example embodiments herein provide a method and a DSDS UE for managing HARQ feedback transmission in a wireless communication network. The method includes determining whether a parameter associated with the at least one primary packet data is identical to a parameter associated with the at least one secondary packet data, the parameter including a reordering timer value, New Data Indicator (NDI), HARQ process number, and a DSDS Radio Frequency (RF) gap duration. Further, the method includes determining that the parameter associated with the at least one primary packet data is identical to the parameter associated with the at least one secondary packet data. Furthermore, the method includes performing the HARQ ACK transmission process with the wireless communication network in response to determining that the parameter associated with the at least one primary packet data is identical to the parameter associated with the at least one secondary packet data given primary packet data is successfully decoded.

Unlike conventional methods and conventional systems, in which modem blocks, such as infinite impulse response (IIR) filters, automatic gain control (AGC), AFC, channel estimator, and equalizer of the DSDS UE may use a finite time (i.e., incurring delay) to converge to a pre-paused values (values prior to DSDS RF gap event) of the DSDS RF gap event, the proposed method allows the DSDS UE to reduce the latency by reducing the finite time used for packet recovery during the DSDS RF gap resume event.

Unlike conventional methods and conventional systems, in which during the DSDS RF gap resume event, the DSDS UE encounters high amount of cyclic redundancy check (CRC) errors, due to the modem blocks of the DSDS UE continuing the process of convergence, the proposed method can be used to reduce (and/or eradicate) the CRC errors by reducing the duplicate retransmissions of already successfully received packets when the DSDS UE encounters the DSDS RF gap event.

Figure 1:
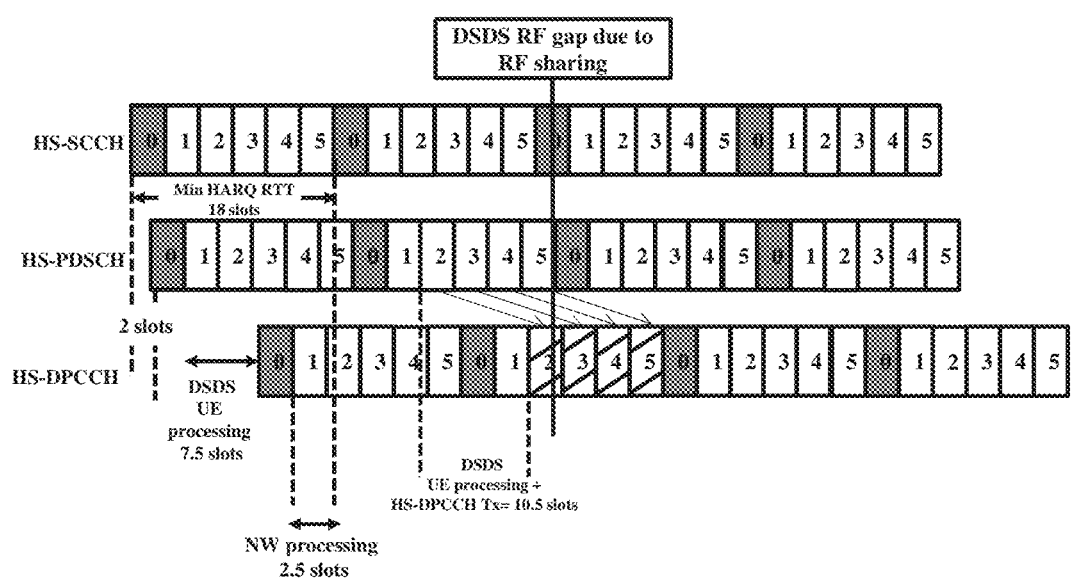
FIG. 1 is a resource format (i.e., a terminal of a UE) illustrating a HARQ interaction with a DSDS UE.

FIG. 1 is a resource format (i.e., a terminal of a UE) illustrating a HARQ interaction with the UE.

A high-speed shared control channel (HS-SCCH) receives a user data that is to be transmitted to a network. The HS-SCCH carries the modulation and coding scheme, channelization code, time slot and transport block size information for the user data. Further, the HS-SCCH carries the HARQ process, redundancy version, and new data indicator (NDI) information for the user data.

The HS-SCCH transmit the user data to a high-speed physical downlink shared channel (HS-PDSCH). The HS-PDSCH transmission follows in the next subframe (n+1), and as a result, the UE decodes the user data after 2 slots (as shown, "0" is aligned after 2 slots, in the HS-PDSCH). Once the UE completely decodes the HS-PDSCH, the UE can be configured to send reception of HARQ ACK/NACK to a HS-DPCCH after 7.5 slots. Thus, the overall transmission delay, from the UE, can be, e.g., 3+7.5 slots=10.5 slots.

Further, once the network receives the user data, the network can be configured to identify the HARQ decoding status, i.e., ACK/NACK. If the network identifies the HARQ decoding status as the NACK, then the network retransmits the packet data. For example, the retransmission interval can be as defined by the network, and the retransmission interval can be with the delay of 2.5 slots and/or 8.5 slots depending on a number of configured HARQ processes.

A DSDS UE may include more than one subscriber identity module (SIM) or universal subscriber identity module (USIM). The DSDS UE with more than one SIM may be referred to as a multi-SIM device. In the present disclosure, the SIM may refer to a SIM or a USIM. Each SIM may also include a unique International Mobile Subscriber Identity (IMSI) and service subscription information. Each SIM may be configured to operate in a radio access technology (RAT).

The DSDS UE supports a multi-SIM multi-standby operation using a single RF chain to transmit and receive communications. In one example, a multi-SIM device includes a first SIM dedicated to operate in a first RAT, and a second SIM dedicated to operate in a second RAT. When a stack-1 (of the first SIM) of the DSDS UE is performing a high-speed downlink packet access/Long Term Evolution (HSDPA/LTE) data transfer, it may use the RF continuously. However to maintain paging reception, measurements and signaling on the stack-2 (of the second SIM) of the DSDS UE, RF usage gaps (i.e., DSDS RF gaps) are created temporarily for the stack-1 either in scheduled or unscheduled fashion.

In furtherance to the RF gaps, the RF currently occupied by the stack-1 is shut down and is given to the stack-2, as shown in FIG. 1, "DSDS RF gap due to RF sharing." As a result, the user data is received until the subframe "5" in both the HS-SCCH and HS-PDSCH, but the transmission of the ACK/NACK reception of the user data (i.e., data packets) using the HS-DPCCH is interrupted due to incurrence of the RF shutdown event.

The UL ACK/NACK feedback follows pre-defined timing with DL HS-PDSCH reception. The ACK/NACK feedback of up to four HARQ processes can be unambiguous at every DSDS disruption.

Thus, the data packets 2, 3, 4 and 5 (i.e., transmission of the ACK/NACK reception) on the HS-DPCCH is not transmitted to the network. Thus, the network, upon detecting the failure of ACK/NACK reception, can therefore retransmit the data packets.

For example, 6 HARQ processes are configured for the UE, and the same is scalable to a maximum of 8 HARQ processes.

These disruptions, due to the RF gap event, cause loss in throughput, and increase latency due to packet recovery delay during HARQ process.

Figure 2:
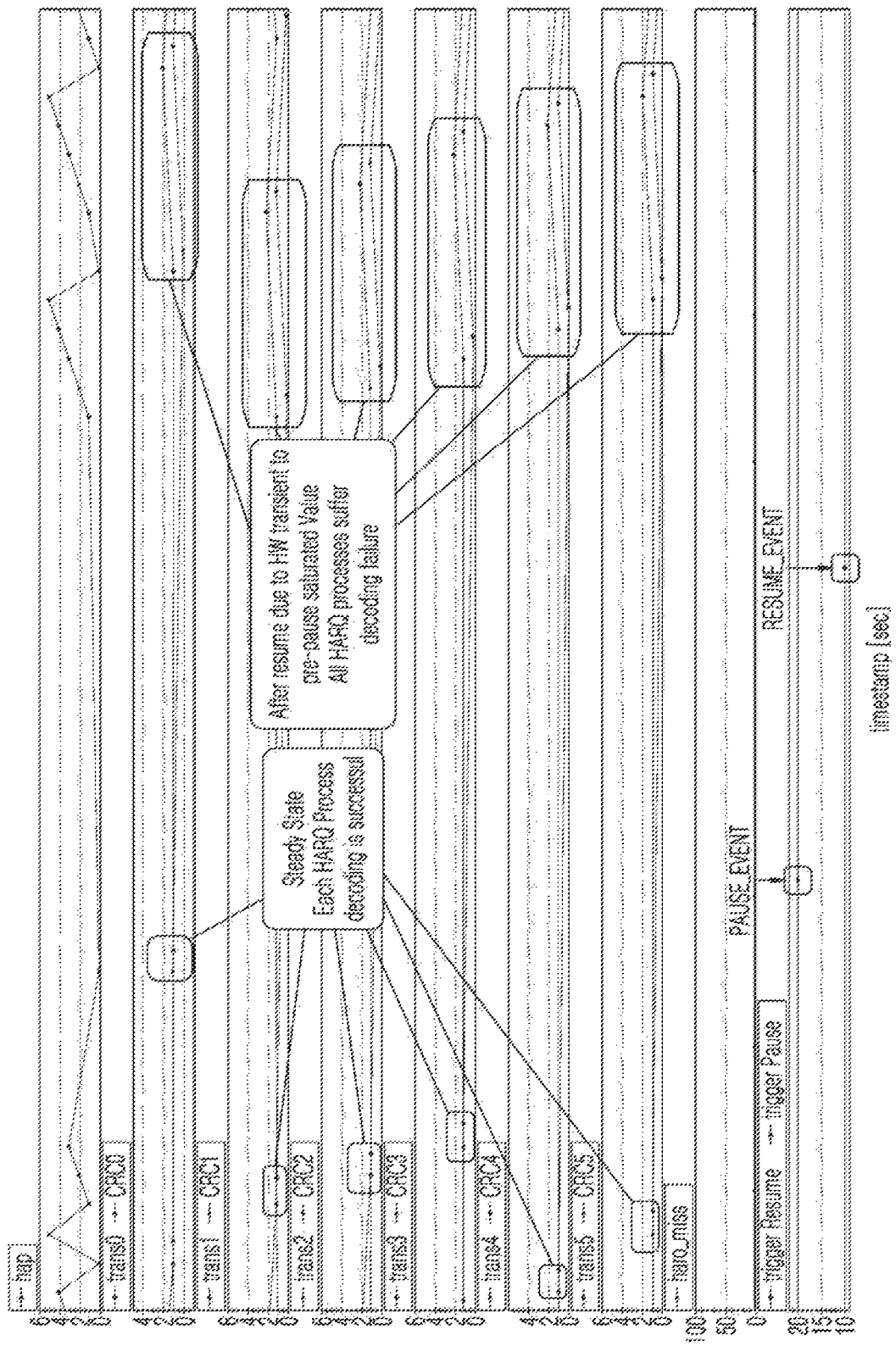
FIG. 2 is a semantic view of a log file illustrating a HARQ decoding status prior to DSDS RF gap event and the HARQ decoding status after the DSDS RF gap event.

FIG. 2 is a semantic view of a log file illustrating a HARQ decoding status prior to a DSDS RF gap event and the HARQ decoding status after the DSDS RF gap event.

As seen the log file, the decoding of the primary packet data is successful, whereas the secondary packet data experiences the CRC errors due to a convergence delay of the modem.

Figure 3:
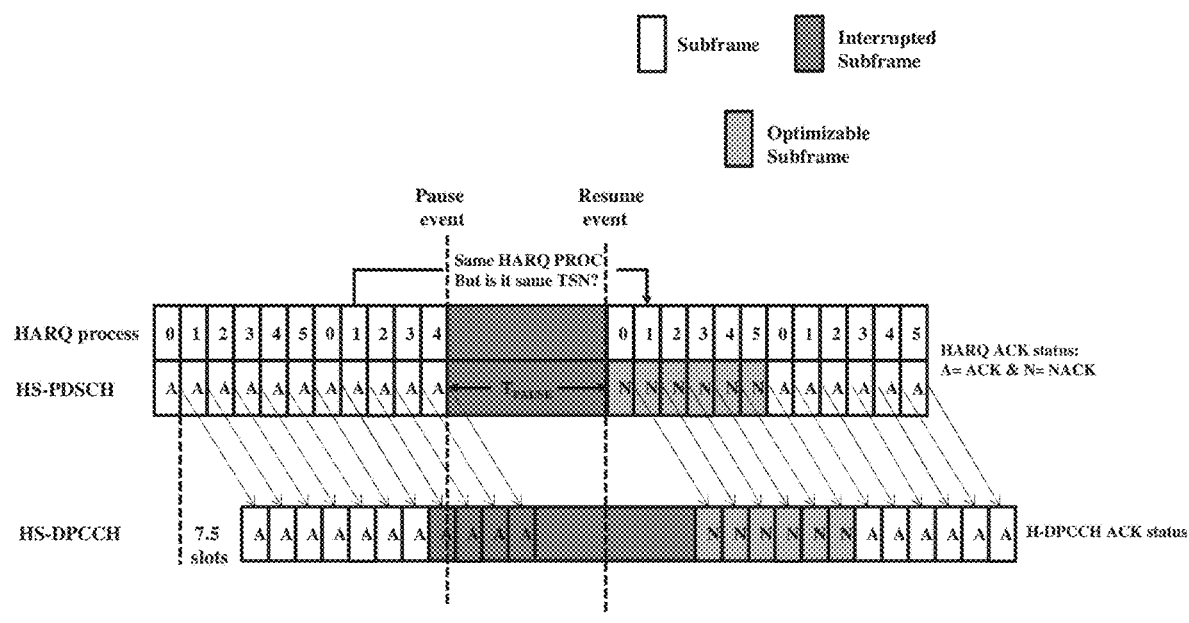
FIG. 3 is a resource format (i.e., a terminal of an DSDS UE) illustrating an HS-PDSCH reception and corresponding HS-DPCCH ACK/NACK timing in a case of HSDPA.

FIG. 3 is a resource format (i.e., a terminal of a DSDS UE) illustrating an HS-PDSCH reception and corresponding HS-DPCCH ACK/NACK timing in a case of HSDPA.

As stated above, when the DSDS UE fails to transmit the HARQ ACK/NACK status information on a feedback channel (Ex:-HS-DPCCH in HSPA), then the NW retransmits those packet data in subsequent HARQ cycles even though that may have been successfully received at the DSDS UE. These retransmissions of the packet data by the NW cause duplication/wastage of wireless resource.

The NDI is a single bit information that may toggle every time different data is retransmitted on that HARQ process. The NDI toggles when either the NW received an ACK from the DSDS UE or the NW attempted maximum HARQ retransmissions. The number of retransmissions made by the NW is not explicitly communicated by the NW. Thus, the NDI cannot be used for clearly establishing a relationship of current packet data (i.e., DSDS RF resume) with pre-pause packet data.

Figure 4:
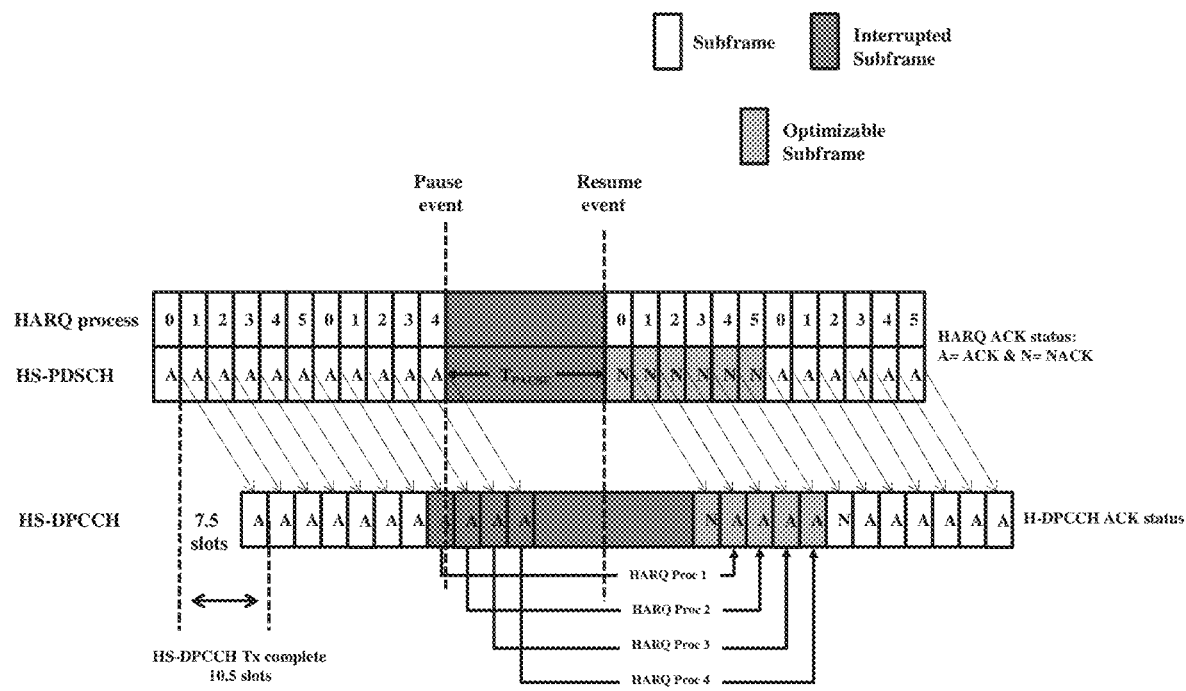
FIG. 4 is a resource format (i.e., a terminal of a DSDS UE) illustrating a HS-PDSCH reception and corresponding HS-DPCCH ACK/NACK timing in a case of HSDPA, according to example embodiments.

FIG. 4 is a resource format (i.e., a terminal of a DSDS UE) illustrating a HS-PDSCH reception and corresponding HS-DPCCH ACK/NACK timing in a case of HSDPA, according to example embodiments.

Unlike to conventional methods and conventional systems (as detailed in the FIG. 3), the proposed method can be used to determine the relation between the current packet data with pre-pause packet data using a combination of parameters such as, for example, RF pause duration, the NDI, the reordering timer (Timer $T_1$) value and the HARQ process number received on the HS-SCCH.

Referring to the FIG. 4, in furtherance to the RF gaps, the RF currently occupied by the stack-1 is shut down and is given to the stack-2. As a result, the user data is received until the subframe "4" in both the HS-SCCH and HS-PDSCH, but the transmission of the ACK/NACK reception of the user data (i.e., data packets) using the HS-DPCCH is interrupted due to incurrence of the RF shutdown event.

Thus, the data packets 1, 2, 3 and 4 on the HS-DPCCH are not transmitted to the NW. Thus, the network detects the failure of ACK/NACK reception. In an example embodiment, if the retransmissions on the HARQ processes (HARQ Proc) after RF resume can be linked to their reception before RF Pause, then the HARQ ACK can be transmitted even though the current reception may be in error.

In an example embodiment, the ACK for the user data can be sent on the feedback channel (for example, HS-DPCCH in HSDPA and PUCCH/PUSCH in LTE).

In an example embodiment, if the new packet data in the CRC error is not related to the previous reception, then the DSDS UE can be configured to send the current HARQ decoded status information on the HS-DPCCH.

In an example embodiment, the following are the conditions considered to determine the relation between the current retransmission and previous transmission:
  (a) The RF Pause duration suffered by HARQ Process "j" be Dj
  (b) Current HARQ proc and previous HARQ proc may be the same (say "j")
  (c) Duration from end of HS-PDSCH reception on "j" to end of corresponding HS-DPCCH Transmission may be ≤10.5 ms
  (d) $Dj \le T_1$ (if $Dj > T_1$, then the NW stops retransmissions and performs new transmission of different data)
  (e) Current NDI on HARQ proc "j" may be equal to previous NDI on HARQ Proc "j"

Figure 5:
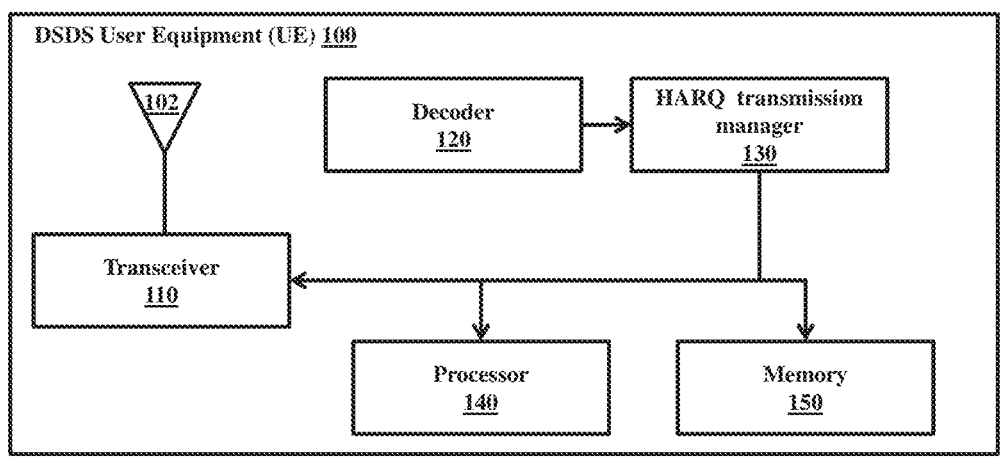
FIG. 5 is a block diagram illustrating various hardware elements of a DSDS UE, according to example embodiments.

FIG. 5 is a block diagram illustrating various hardware elements of a DSDS UE 100, according to example embodiments.

In an example embodiment, the DSDS UE 100 includes, for example, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The DSDS UE 100 can also be, for example, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The DSDS UE 100 includes an antenna 102, a transceiver 110, a decoder 120, a HARQ transmission manager 130, a processor 140, and a memory 150.

The transceiver 110, coupled with antenna 102, can be configured to communicate with various other apparatus over a transmission medium. The various other apparatus includes, for example, a network and any other UE. The network can include, for example, at least one evolved node B (eNB), a base station (BS), a base transceiver station (BTS), a radio base station, a radio transceiver, a transceiver function, a basic service set (BSS), an extended service set (ESS), an access point (AP), and/or the like.

The decoder 120 can be configured to decode the user data (i.e., packet data) available at one or more resource channels. The one or more resource channels include, for example, HS-SCCH, HS-PDSCH, HS-DPCCH, PDCCH, and the like.

The HARQ transmission manager 130 can be configured to manage the ACK/NACK feedback reception of the user data. The details of the HARQ transmission manager 130 is provided in FIG. 6.

The memory 150 can be, for example, a computer-readable medium such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, and/or a removable disk. Although memory is shown separate from the processors in the various aspects presented throughout this disclosure, the memory may be internal to the processors (e.g., cache or register).

Figure 6:
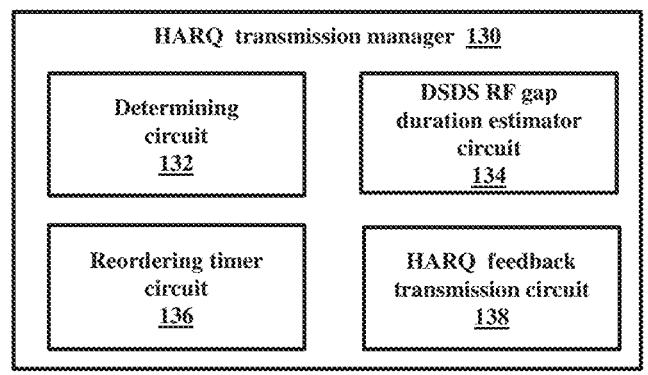
FIG. 6 is a block diagram illustrating various hardware elements of a HARQ feedback manager, according to example embodiments.

FIG. 6 is a block diagram illustrating various hardware elements of the HARQ feedback manager 130, according to example embodiments.

The HARQ feedback manager 130 can include, for example, a determining circuit 132, a DSDS RF gap duration estimator circuit 134, a reordering timer circuit 136, and a HARQ feedback transmission circuit 138.

In an example embodiment, the determining circuit 132 can be configured to determine whether the parameter associated with the at least one primary packet data is identical to a parameter associated with at least one secondary packet data. In an example embodiment, the parameter can include, for example, a reordering timer value, the NDI, an HARQ process (i.e., HARQ proc) number, and a DSDS Radio Frequency (RF) gap duration.

The at least one primary packet data can include the user data received prior to the DSDS RF gap event. Similarly, the at least one secondary packet data can include the current user data after the DSDS RF gap event (i.e., after the RF is resumed and utilized by the stack-1).

The DSDS RF gap duration estimator circuit 134 can be configured to determine the DSDS RF gap duration by taking the difference of wraparound adjusted frame and slot numbers of the at least one primary packet data with frame and slot numbers of the at least one secondary packet data.

The reordering timer circuit 136 can be configured to determine an order of Transmission Sequence Numbers (TSNs). The reordering entity defines a $T_1$ duration as the MAX time the DSDS UE 100 has to wait for receiving missing TSNs through retransmissions. The reordering timer can be, for example, a reordering timer $T_1$. Further, details of the reordering timer circuit 136 is explained in conjunction with FIG. 7.

Further, the determining circuit 132 can be configured to determining that the parameter associated with the at least one primary packet data is identical to the parameter associated with the at least one secondary packet data.

The HARQ feedback transmission circuit 138 can be configured to perform the HARQ ACK transmission process with the NW in response to the indication received from the determining circuit 132. The HARQ feedback transmission includes one of synchronous HARQ feedback transmission and asynchronous HARQ feedback transmission.

Unlike to conventional methods and conventional systems, the HARQ feedback transmission circuit 138 does not assume a fixed timing relation between successive retransmissions on the same HARQ processes. Instead, it explicitly depends on the HARQ process number and the NDI.

In an example embodiment, the HARQ ACK transmission to the NW is done using one of the HS-DPCCH in WCDMA and PUCCH/PUSCH in LTE.

The HSPA and the LTE follow asynchronous HARQ in Downlink (i.e., a same HARQ process can be scheduled any time after the minimum RTT, which is 18 slots in HSPA). Hence the HARQ process ID is sent through separate signaling (e.g., HS-SCCH in HSPA). If a relation between post DSDS RF resume and pre-DSDS RF gap event transmissions can be established, the successfully received packets can be acknowledged after the RF resume from the DSDS RF gap event, and unnecessary retransmission can be avoided.

In another example embodiment, the determining circuit 132 determines that the parameter associated with the at least one primary packet data is not identical to the parameter associated with the at least one secondary packet data. Further, the determining circuit 132 can be configured to perform the HARQ feedback transmission process with the NW using current HARQ decoding status information (e.g., NACK).

In an example embodiment, the HARQ feedback transmission process with the NW using the current HARQ decoding status information is done using one of the HS-DPCCH in WCDMA and the PUCCH/PUSCH in LTE.

Figure 7:
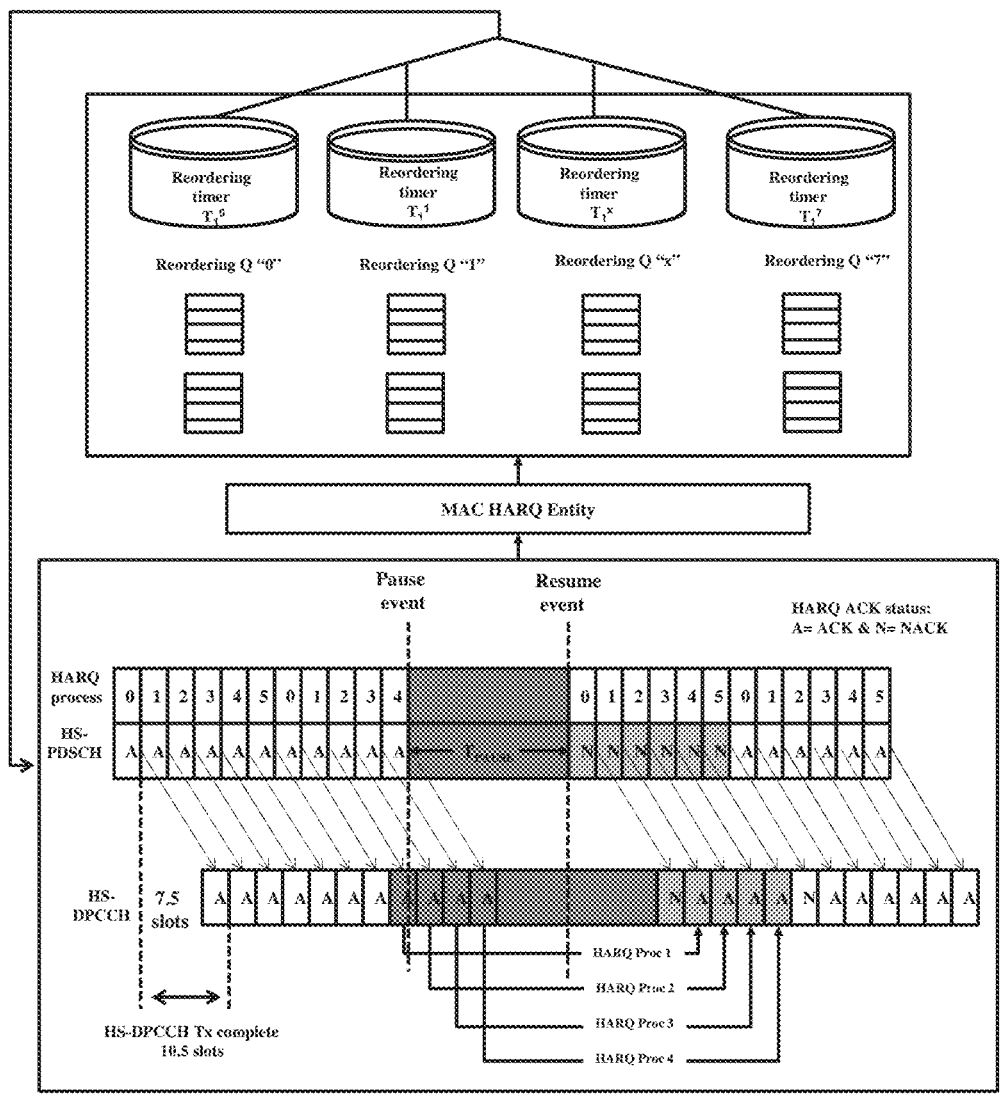
FIG. 7 illustrates a cross layer view of a reordering timer $T_1$ feedback from a reordering entity to a physical layer, according to example embodiments.

FIG. 7 illustrates a cross layer view of a reordering timer $T_1$ feedback from a reordering entity to a physical layer (PHY), according to example embodiments.

In an example embodiment, the reordering timer circuit 136 can be configured to link the receptions, i.e., at least one primary packet data and the least one secondary packet data that are separated in time.

The HARQ entity cannot guarantee in-sequence delivery. The reordering entity is responsible to order the TSNs. The reordering entity defines a $T_1$ duration as the MAX time the DSDS UE 100 has to wait for receiving the missing TSNs through retransmissions. Beyond the $T_1$ duration, the NW will not re-transmit the missing TSN. This can indicate MAX retransmissions the NW may attempt to deliver the TSN.

For example, consider a case in which $T_1$=60 ms, with 6 HARQ processes ($N_{HARQ}$) and a TTI duration of 2 ms, the max number of retransmissions the NW may attempt is:

$$\text{MaxHQRQ } Retx = T_1/N_{HARQ} = 60 \text{ ms}/6*2 \text{ ms} = 5 \quad \text{Equation (1)}$$

In an example embodiment, following are the conditions considered to determine the relation between the current retransmission and previous transmission:

(a) Let the RF Pause duration suffered by HARQ Process "j" be Dj
(b) Current HARQ proc and previous HARQ proc may be the same (say "j")
(c) Duration from an end of HS-PDSCH reception on "j" to an end of corresponding HS-DPCCH Transmission may be ≤10.5 ms
(d) Dj≤$T_1$ (if Dj>$T_1$, then the NW stops retransmissions and performs new transmission of different data)
(e) Current NDI on HARQ proc "j" may be equal to previous NDI on HARQ Proc "j"

Referring to the FIG. 7, the reordering timer circuit 136 can include at least one reordering timer (i.e., $T_1^0$, $T_1^1$, $T_1^x$, $T_1^7$) circuit per one reordering queue. For example, MAX 8 reordering queues (reordering "Q" 0, 1, x, . . . 7) may be configured by the NW. The minimum of the configured $T_1$ duration is fed back to lower layers for identifying the relating the transmission across the DSDS RF pause.

Further, the decoding (using the decoder 120) result of each HARQ process (i.e., feedback) is stored along with the timestamp it was received on. After the DSDS RF resume event is detected, the determining circuit 132 can be configured to compute the delay (Dj) from the last reception on "j" until the current reception. Thus, based on the aforementioned conditions, if the current received data (erroneous) is related to past correctly received data, the HARQ feedback transmission circuit 138 feedbacks ACK on the HS-DPCCH using stored feedback.

Unlike conventional methods and conventional systems, the proposed method can be used to establish the relationship between the erroneous reception after DSDS RF resume and successful reception just before DSDS RF gap event. If the retransmission after DSDS RF resume is the same as that received before the DSDS RF gap event, then the HARQ ACK can be transmitted instead of NACK, thereby avoiding the unnecessary retransmissions of the packet data.

Figure 8:
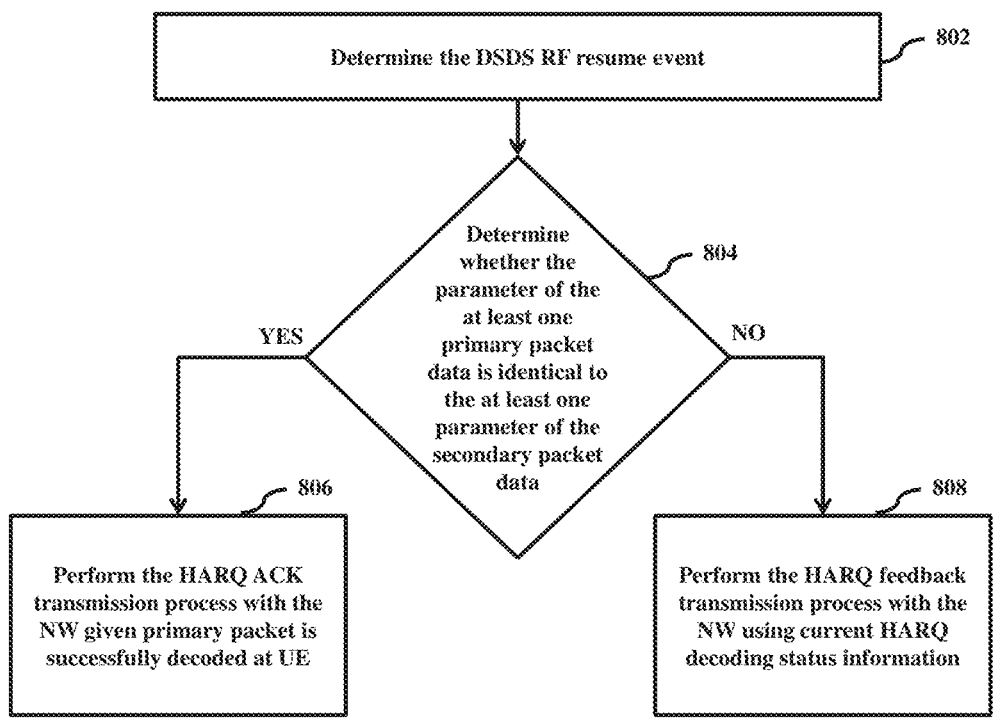
FIG. 8 is a flow diagram illustrating a method for managing HARQ feedback transmission by a DSDS UE, according to example embodiments.

FIG. 8 is a flow diagram illustrating a method for managing HARQ feedback transmission by the DSDS UE 100, according to example embodiments.

At step 802, the method includes determining the DSDS RF resume event. In an example embodiment, the method allows the determining circuit 132 to determine the DSDS RF gap event.

At step 804, the method includes determining whether the parameter of the at least one primary packet data is identical to the parameter of the at least one secondary packet data. In an example embodiment, the method allows the determining circuit 132 to determine whether the parameter of the at least one primary packet data is identical to the parameter of the at least one secondary packet data.

If at step 804, the DSDS UE 100 determines that the parameter of the at least one primary packet data is identical to the parameter of the at least one secondary packet data, then, at step 806, the method includes performing the HARQ ACK transmission process with the NW given that the at least one primary packet is successfully decoded at the DSDS UE 100. In an example embodiment, the method allows the HARQ feedback transmission circuit 138 to perform the HARQ ACK transmission process with the NW.

If at step 804, the DSDS UE 100 determines that the parameter of the at least one primary packet data is not identical to the parameter of the at least one secondary packet data, then, at step 808, the method includes performing the HARQ feedback transmission process with the NW using current HARQ decoding status information.

Figure 9:
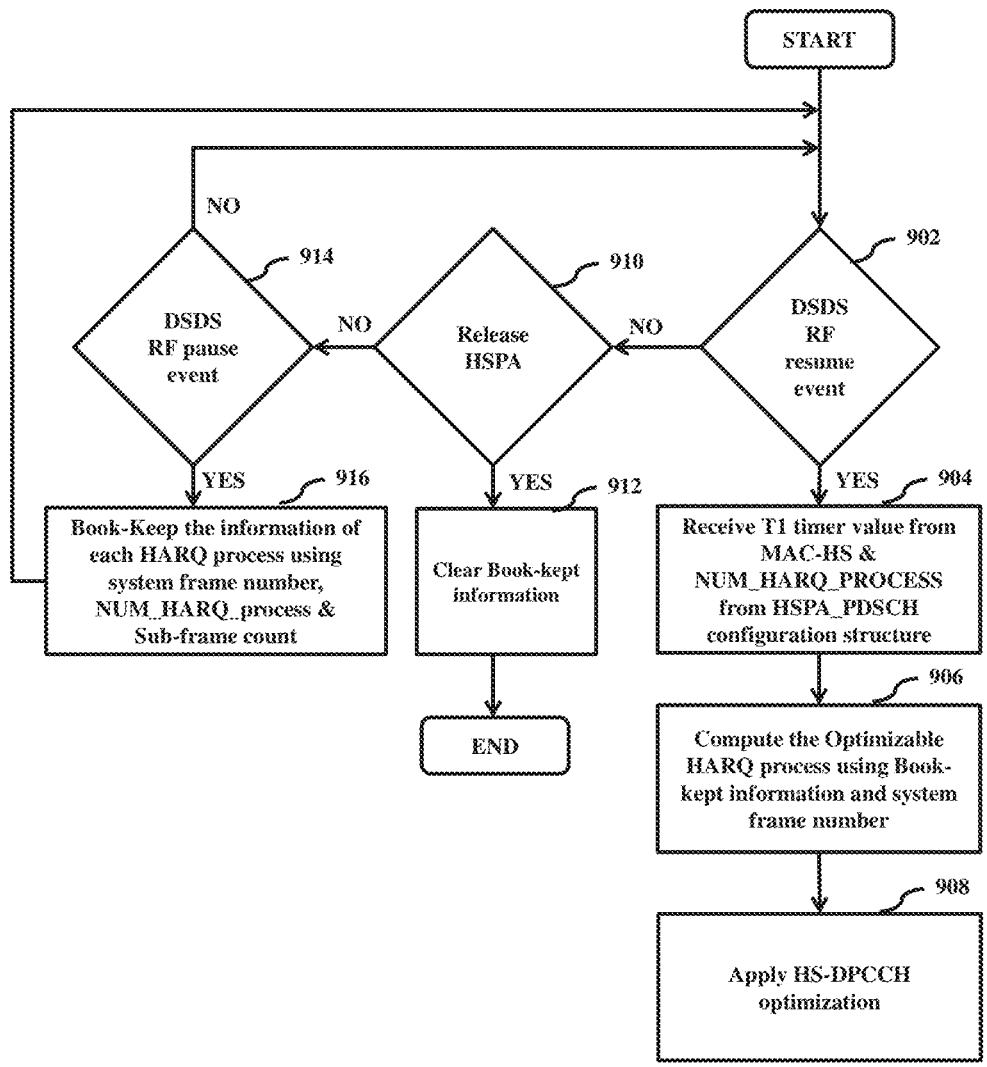
FIG. 9 is a flow diagram illustrating a method for optimizing HARQ transmission in a DSDS UE, according to example embodiments.

FIG. 9 is a flow diagram illustrating a method for optimizing HARQ transmission in an DSDS UE, according to example embodiments.

The DSDS UE 100 includes a book (i.e., a DSDS UE book) for storing the timing information and NDI for each HARQ process before the DSDS RF pause event occurs. Further, when the DSDS UE 100 detects the DSDS UE RF resume event (DSDS RF gap resume), then the DSDS UE 100 utilizes the feedback $T_1$ information and the HARQ process information (stored in the DSDS UE book) to identify the HARQ processes that can be optimized. Further, the DSDS UE 100 can transmit the HARQ decoding status to the network.

At step 902, the method includes determining whether the DSDS RF resume event is occurred. In an example embodiment, the method allows the determining circuit 132 to determine whether the DSDS RF resume event has occurred.

If at step 902, determining circuit 132 determines that the DSDS RF resume event has occurred, then at step 904, the method includes receiving a $T_1$ timer value from MAC-HS and NUM_HARQ_PROCESS from an HSPA_PDSCH configuration structure. Further, at step 906, the method includes computing the Optimizable HARQ process using Book-kept information and a system frame number. Further, at step 908, the method includes applying the HS-DPCCH optimization in WCDMA and PUCCH/PUSCH in LTE.

If at step 902, the determining circuit 132 determines that the DSDS RF resume event has not occurred, then at step 910, the method includes determining whether HSPA is released. In an example embodiment, the method allows the determining circuit 132 to determine whether the HSPA is released. If at step 910, the determining circuit 132 determines that the HSPA is released, then at step 912, the method includes clearing the book-kept information.

If at step 910, the determining circuit 132 determines that the HSPA is not released then, at step 914, the method includes determining whether the DSDS RF pause event has occurred. In an example embodiment, the method allows the determining circuit 132 to determine whether the DSDS RF pause event has occurred. If at step 914, the determining circuit 132 determines that the DSDS RF pause event has occurred, then at step 916, the method includes Book-Keep the information of each HARQ process using the system frame number, NUM_HARQ_PROCESS and a Sub-frame count. If at step 914, the determining circuit 132 determines that the DSDS RF pause event has not occurred, then the method loops back to perform step 902.

As is traditional in the field of the inventive concepts, the example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of the example embodiments will fully reveal the general nature of the example embodiments herein that others can, by applying current knowledge, readily modify or adapt for various applications of such example embodiments without departing from the generic concept, and, therefore, such adaptations and modifications are intended to be comprehended within the meaning and range of equivalents of the disclosed example embodiments. It is to be understood that the phraseology or terminology employed herein is for the purpose of description and not of limitation. Therefore, those skilled in the art will recognize that the example embodiments herein can be practiced with modification within the spirit and scope of the example embodiments as described herein.

What is claimed is:

1. A method for managing Hybrid Automatic Repeat Request (HARQ) feedback transmission by a Dual Sim Dual Standby (DSDS) User Equipment (UE) in a wireless communication network, the method comprising:
    determining, by the DSDS UE, whether a first parameter associated with a primary packet data is identical to a second parameter associated with a secondary packet data;
    determining the DSDS Radio Frequency (RF) gap duration as a difference of wraparound adjusted frame and slot numbers of the primary packet data with frame and slot numbers of the secondary packet data;
    determining the DSDS RF gap is less than a reordering timer value; and
    in response to the first parameter associated with the primary packet data being determined to be identical to the second parameter associated with the secondary packet data and the DSDS RF gap duration between the primary packet data and the secondary packet data being determined less than the reordering timer value and the primary packet data being successfully decoded at the DSDS UE, performing, by the DSDS UE, the HARQ feedback transmission with the wireless communication network.

2. The method of claim 1, further comprising, in response to the first parameter associated with the primary packet data being determined to be not identical to the second parameter associated with the secondary packet data or the DSDS RF gap duration being determined to be not less than the reordering timer value, performing, by the DSDS UE, the HARQ feedback transmission with the wireless communication network, using current HARQ decoding status information.

3. The method of claim 1, wherein the primary packet data is received prior to a DSDS RF gap event, and
    wherein the secondary packet data is received after the DSDS RF gap event.

4. The method of claim 1, wherein the HARQ feedback transmission is performed using one of a High Speed Dedicated Physical Control Channel (HS-DPCCH) in a Wideband Code Division Multiple Access (WCDMA) network, a Physical Uplink Control Channel (PUCCH) in a Long-Term Evolution (LTE) network and a Physical Uplink Shared Channel (PUSCH) in the LTE network.

5. The method of claim 1, wherein the determining whether the first parameter associated with the primary packet data is identical to the second parameter associated with the secondary packet data comprises:
    determining whether a first New Data Indicator (NDI) of the primary packet data is identical to a second NDI of the secondary packet data; and
    determining whether a first HARQ process number of the primary packet data is identical to a second HARQ process number of the secondary packet data.

6. The method of claim 1, wherein the reordering timer value is a minimum value among available reordering timer values associated with preconfigured reordering queues.

7. The method of claim 1, wherein the HARQ feedback transmission comprises synchronous HARQ feedback transmission or asynchronous HARQ feedback transmission.

8. A Dual Sim Dual Standby (DSDS) User Equipment (UE) for managing Hybrid Automatic Repeat Request (HARQ) feedback transmission in a wireless communication network, the DSDS UE comprising:
    a memory;
    a processor coupled to the memory; and
    a HARQ feedback manager coupled to the processor and configured to:
        determine whether a first parameter associated with a primary packet data is identical to a second parameter associated with a secondary packet data,
        determine the DSDS Radio Frequency (RF) gap duration as a difference of wraparound adjusted frame and slot numbers of the primary packet data with frame and slot numbers of the secondary packet data;
        determine the DSDS RF gap is less than a reordering timer value; and
        in response to the first parameter associated with the primary packet data being determined to be identical to the second parameter associated with the secondary packet data and the DSDS RF gap duration between the primary packet data and the secondary packet data being determined less than the reordering timer value and the primary packet data being successfully decoded at the DSDS UE, perform the HARQ feedback transmission with the wireless communication network.

9. The DSDS UE of claim 8, wherein the HARQ feedback manager is further configured to, in response to the first parameter associated with the primary packet data being determined to be not identical to the second parameter associated with the secondary packet data or the DSDS RF gap duration being determined to be not less than the reordering timer value, perform the HARQ feedback transmission with the wireless communication network, using current HARQ decoding status information.

10. The DSDS UE of claim 8, wherein the primary packet data is received prior to a DSDS RF gap event, and
    wherein the secondary packet data is received after the DSDS RF gap event.

11. The DSDS UE of claim 8, wherein the HARQ feedback transmission is performed using one of a High Speed Dedicated Physical Control Channel (HS-DPCCH) in a Wideband Code Division Multiple Access (WCDMA) network, a Physical Uplink Control Channel (PUCCH) in a Long-Term Evolution (LTE) network and a Physical Uplink Shared Channel (PUSCH) in the LTE network.

12. The DSDS UE of claim 8, wherein the HARQ feedback manager is further configured to:
    determine whether a first New Data Indicator (NDI) of the primary packet data is identical to a second NDI of the secondary packet data; and
    determine whether a first HARQ process number of the primary packet data is identical to a second HARQ process number of the secondary packet data.

13. The DSDS UE of claim 8, wherein the reordering timer value is a minimum value among available reordering timer values associated with preconfigured reordering queues.

14. The DSDS UE of claim 8, wherein the HARQ feedback transmission comprises synchronous HARQ feedback transmission or asynchronous HARQ feedback transmission.

15. A method for managing Hybrid Automatic Repeat Request (HARQ) feedback transmission by a Dual Sim Dual Standby (DSDS) User Equipment (UE) in a wireless communication network, the method comprising:

receiving, by the DSDS UE, a primary packet data and a secondary packet data after a DSDS Radio Frequency (RF) gap duration from a time of the receiving of the primary packet data;

determining the DSDS Radio Frequency (RF) gap duration as a difference of wraparound adjusted frame and slot numbers of the primary packet data with frame and slot numbers of the secondary packet data;

determining the DSDS RF gap is less than a reordering timer value; and in response to the DSDS RF gap duration being determined to be greater than or equal to the reordering timer value, performing, by the DSDS UE, the HARQ feedback transmission using a second decoding result of the secondary packet data.

16. The method of claim 15, wherein the reordering timer value is a minimum value among available reordering timer values associated with preconfigured reordering queues.

17. The method of claim 15, further comprising:
determining, by the DSDS UE, whether a HARQ related first parameter associated with the primary packet data is identical to a HARQ related second parameter associated the secondary packet data; and in response to the HARQ related first parameter being determined to be identical to the HARQ related second parameter, performing, by the DSDS UE, the HARQ feedback transmission using a first decoding result of the primary packet data.

18. The method of claim 17, wherein the determining whether the first parameter associated with the primary packet data is identical to the second parameter associated with the secondary packet data comprises:
determining whether a first New Data Indicator (NDI) of the primary packet data is identical to a second NDI of the secondary packet data; and determining whether a first HARQ process number of the primary packet data is identical to a second HARQ process number of the secondary packet data.

19. The method of claim 15, further comprising:
generating, by the DSDS UE, a first decoding result by decoding the primary packet data; and storing, by the DSDS UE, the first decoding result in memory of the DSDS UE.

20. The method of claim 15, wherein the HARQ feedback transmission comprises synchronous HARQ feedback transmission or asynchronous HARQ feedback transmission.

* * * * *